United States Patent [19]

Rebsamen

[11] Patent Number: 4,712,048
[45] Date of Patent: Dec. 8, 1987

[54] PROCESS AND APPARATUS FOR CONTROLLING THE SPINDLE SPEED OF A GEAR CUTTING MACHINE

[75] Inventor: Roland Rebsamen, Greifensee, Switzerland

[73] Assignee: Reishauer AG., Zurich, Switzerland

[21] Appl. No.: 876,156

[22] Filed: Jun. 19, 1986

[30] Foreign Application Priority Data

Jun. 26, 1985 [CH] Switzerland ............... 2735/85

[51] Int. Cl.$^4$ .......................... H02P 5/46
[52] U.S. Cl. ....................... 318/85; 318/41; 318/69; 318/77; 409/15
[58] Field of Search ............ 318/85, 671, 39, 41, 318/51, 53, 59, 66, 68, 69, 70, 77, 606, 607, 608, 561, 571, 632; 409/12, 15, 11, 14; 51/2 AA, 2 B; 364/474, 475

[56] References Cited

U.S. PATENT DOCUMENTS

| | | | |
|---|---|---|---|
| 3,430,148 | 2/1969 | Miki | 318/85 X |
| 4,178,537 | 12/1979 | Angst | 318/603 |
| 4,253,050 | 2/1981 | Angst | 318/85 X |
| 4,271,379 | 6/1981 | Eckelmeyer | 318/39 X |
| 4,414,495 | 11/1983 | Sumi | 318/85 X |

Primary Examiner—William M. Shoop, Jr.
Assistant Examiner—Patrick C. Keane
Attorney, Agent, or Firm—Sughrue, Mion, Zinn, Macpeak & Seas

[57] ABSTRACT

A tool spindle is driven by a motor and is connected to an angle of rotation transmitter. The signal of the transmitter connected to the tool spindle represents the desired value for the drive of a work piece spindle. The angle of rotation of the workpiece spindle is measured with another transmitter. A control deviation signal which is fed into a servo amplifier of the workpiece spindle drive via a controller is formed from both transmitter signals. A variable observer circuit into which the control deviation signal is also fed is arranged in parallel to the controller. The control deviation signal is stored sequentially in several sample and hold circuits by means of a multiplexer circuit during one tool revolution. The content of each sample and hold circuit is integrated by means of a respective integrator. During the following cycle, a correction signal, which is added to the output signal of the controller, is formed by sequential interrogation of the integrators by means of a demultiplexer circuit. The multiplexer and demultiplexer circuits are controlled by a synchronizing circuit which is synchronized by an index signal.

9 Claims, 3 Drawing Figures

PROCESS AND APPARATUS FOR CONTROLLING THE SPINDLE SPEED OF A GEAR CUTTING MACHINE

BACKGROUND OF THE INVENTION

The U.S. Pat. Nos. 4,178,537 and 4,253,050 disclose processes wherein a high resolution incremental transmitter of the angle of revolution is connected not only to the workpiece spindle but also to the tool spindle. The faster rotating tool spindle is driven continuously. The angle transmitter assigned to the tool spindle supplies an input to the controller in order to drive the slower rotating workpiece spindle. By appropriate design of the controller and the drive for the workpiece spindle, the workpiece spindle can follow up on the tool spindle in a synchronous manner and at the correct angle.

Of course, arbitrarily high compliance cannot be obtained in this process. However, the control quality that can be obtained determines to a large degree the accuracy of the gear to be machined. Increasing the gain of the circuit is not a solution because, due to the rotating masses that are by necessity in the controlled drive, phase shifts occur automatically in the control path which results in instability at too high a gain in the circuit. Theoretically, of course, it would be possible to obtain the desired behavior with a state controller of high order. This, however, would require complicated calculations of innumerable parameters in very short time intervals in addition to additional extremely accurate and thus expensive transducers. For such controllers neither the mathematics nor the necessary fast computers, which are economically feasible, are currently available.

SUMMARY OF THE INVENTION

The present invention is based on the technical problem of improving the aforementioned process and the apparatus linked with said process such that the accuracy of synchronization can be significantly improved by simple means. The problem is solved by means of the present process for controlling the rate of rotation of a spindle of a gear generating machine, operating in a continuous gear generating process, in which a first spindle has a drive controlled by an electronic controller, in which said controller insures synchronization with a second spindle, in which the angle of rotation of both spindles is measured by a respective transmitter, the measured signal of the angle of rotation transmitter of the second spindle is the control input of the controller, and in which a variable changes cyclically according to the varying mesh, wherein the variable is stored for at least one cycle and wherein the stored value of the variable is added synchronously with an independent signal obtained independently of the variable to the control output of th controller in a successive cycle.

The apparatus for carrying out the process is comprised of a first spindle having a first angle of rotation transmitter connected thereto and a second spindle having a second angle of rotation transmitter connected thereto, controller means providing an output signal and storage circuit means including means for generating and storing a variable signal in discrete time intervals within a cycle and adding circuit means for adding the storage content to the output signal of said controller means synchronously with an independent signal.

The invention takes advantage of the inherent properties of a gear generating machine operating in a continous gear generating process. In addition to radial and axial forces, tangential forces, which must be generated by the corresponding torque of the drive of the workpiece spindle, are primarily exerted on the workpiece during the aforementioned continous gear shaping process. This torque, acting on the workpiece spindle, has a cyclical pattern whose frequency matches the frequency of the mesh between the tool and the workpiece. The limited dynamic compliance of the drive of the workpiece results in errors in the angle of rotation of the workpiece spindle due to the cyclical changes in torque, and thus geometric errors in the gear to be processed. The value of the torque itself depends on many factors such as the shape of the teeth, the number of teeth, the helix angle, chip thickness, etc. When the entire width of the tooth is processed, the average of this value is constant to a large degree but when the tool enters or leaves the gear at the faces of the workpiece it changes. The velocity of change, however, is slow in comparison to the frequency of mesh. It depends only on the tool's rate of feed in the axial direction of the workpiece.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
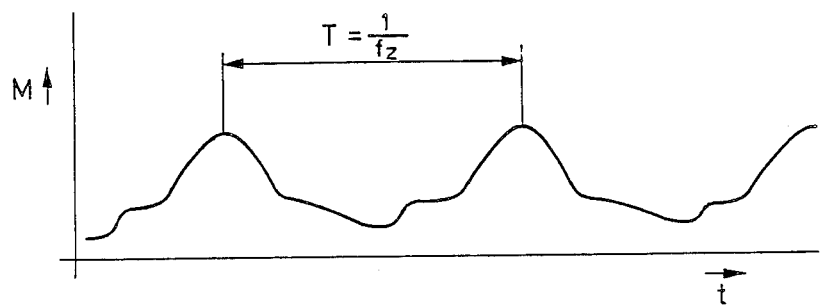
FIG. 1 is a typical graph of the torque, exerted on the workpiece spindle.
Figure 2:
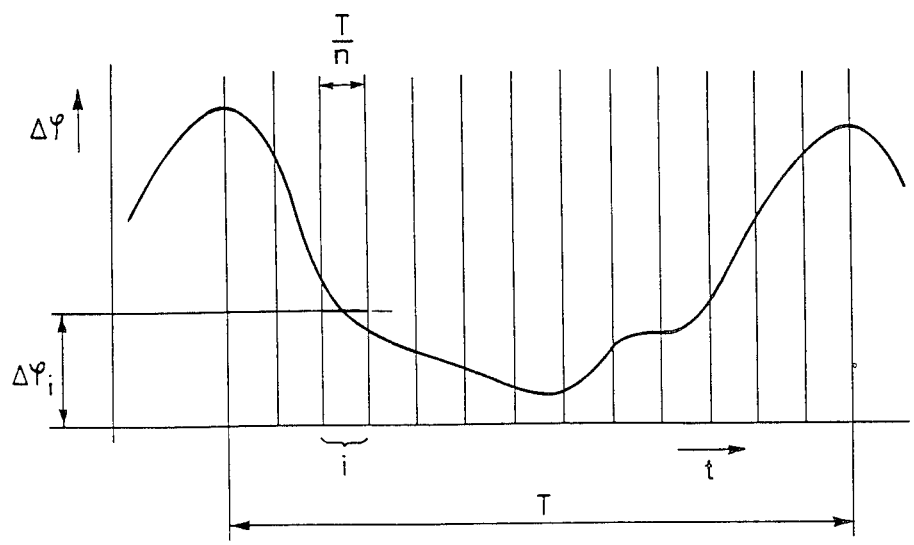
FIG. 2 is a graph showing the control deviation during one cycle with torque according to FIG. 1.

FIG. 1 shows a curve which is typical of the torque exerted on the workpiece spindle. The torque M changes periodically with the cycle time T which is inversely proportional to the tool's frequency $f_z$ of mesh. Due to the limited compliance of the drive of the workpiece spindle, this torque results in a cyclical control deviation $\Delta \phi_i$ (FIG. 2).

Figure 3:
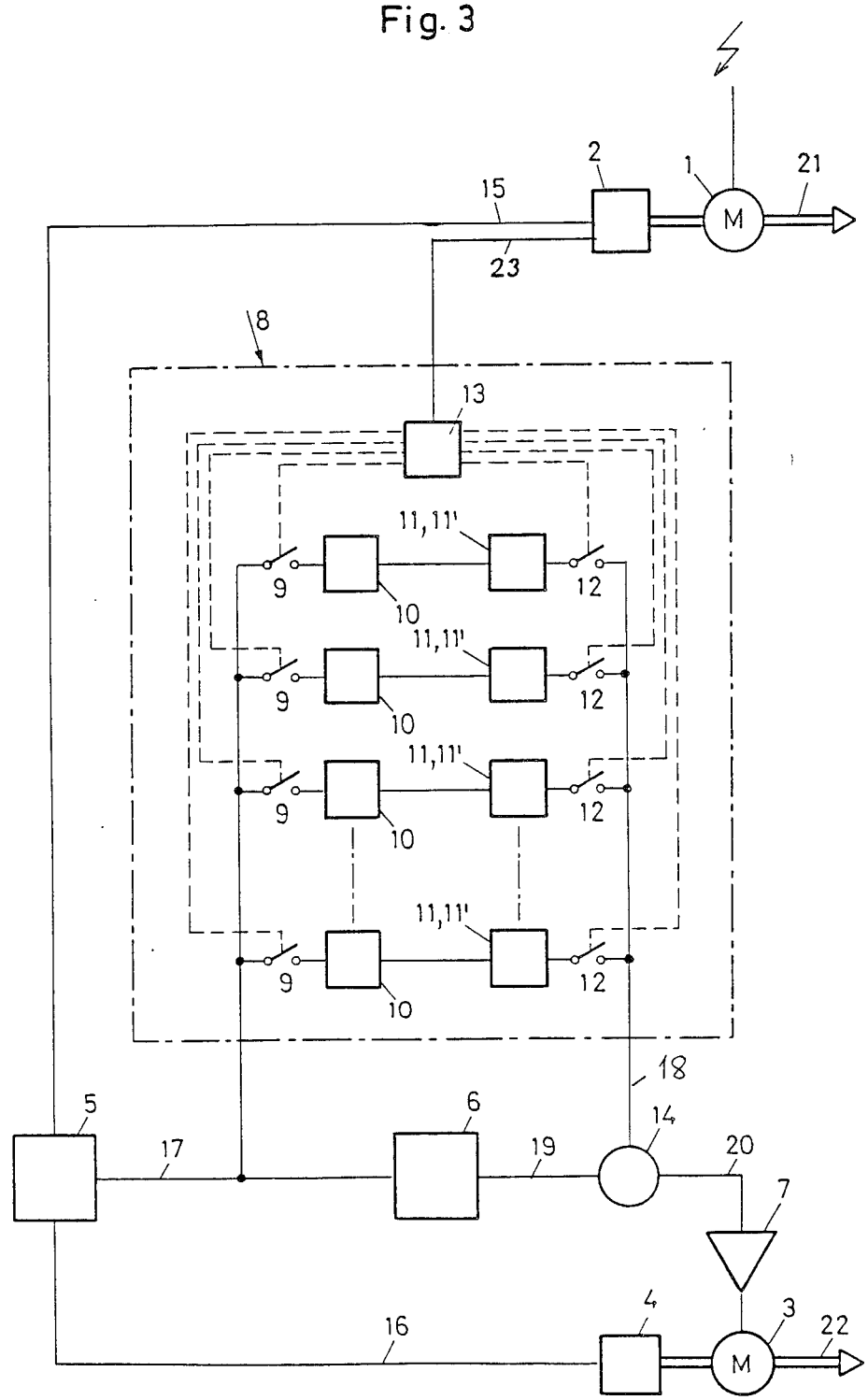
FIG. 3 is a schematic diagram of a control circuit.

FIG. 3 shows the control circuit schematically. A driving motor 1 for the tool drives a tool spindle 21. An incremental transmitter 2 for determining the angle of rotation of spindle 21 is connected to the tool spindle 21. A driving motor 3 for the workpiece drives a workpiece spindle 22 which is connected to another incremental transmitter 4 for determining the angle of rotation of spindle 22. The outputs 15, 16 of transmitters 2, 4 are fed into a summation member 5 for the comparison of desired to actual value which forms the control deviation 17 which is fed into a controller 6. The controller 6 is followed by a servo-power amplifier 7 which drives motor 3. Thus far, this apparatus is known in the art from the U.S. Pat. Nos. 4,178,537 and 4,253,050.

In order to improve the control characteristics, a load variable observer 8, into which the control deviation 17 and a synchronizing signal 23 obtained from an index of transmitter 2 are fed, is wired parallel to the controller 6. This synchronizing signal could also be derived from output signal 15 or 16 of the transmitter 2 or 4 or from a separate component rotating synchronously with one of the spindles 21, 22. The output 18 of the variable observer 8 is added to the output 19 of the controller 6 in a summator 14. The output 20 of the summator 14 enters the amplifier 17.

In the variable observer 8 the control deviation 17 is fed sequentially to each one of the n sample-and-hold circuits 10 by means of an n-fold multiplexer circuit 9. The multiplexer circuit 9 is controlled by a synchronizing circuit 13 which determines the cycle independently of the control deviation 17, in particular, from signal 23 of the incremental transmitter 2. Thus the value of the control deviation is stored at times individually in n increments within a cycle T whereby the mean value $\Delta\phi_i$ within the increment i is fed into the corresponding $i^{th}$ circuit 10 (FIG. 2).

The contents of the sample-and-hold circuits 10 are integrated by means of an integrator 11 each. In the next period a correction signal 18 is formed sequentially out of the contents of the integrators 11 by means of an n-fold demultiplexer circuit 12. Said signal is added to the output signal 19 of the controller 6 in the summation circuit 14. The circuit 12 is also controlled by the synchronizing circuit 13. Simultaneously the new associated value of the control deviation 17 is read into the related sample-and-hold circuit 10.

Since the control deviations are constantly integrated in the integrators 11, the effect of the variable observer 8 corresponds to an integral control so that the effect of the variable load can, in the ideal case, be ruled out to zero. In this manner the measured and stored control deviation 17 is constantly zero during the entire duration of a cycle; and the correction signal, which is stored sequentially in the integrators 11, corresponds accurately to the value of the variable during a cycle, thus to the torque produced during one rotation of the tool spindle. The finer the cycle T is divided the better the approximation of the actual value of the variable is to the actual situation.

In this manner the goal of preprogramming the torque, which is produced during the machining at the workpiece spindle, is achieved. Since the torque produced by the system is adapted to the processing forces that actually occur, the system functions faultlessly even if the tool enters or exits at the faces of the workpiece, i.e., even if the machining forces change. However, steps should be taken to insure that the stored values can change only with a limited slow velocity with respect to the frequency $f_z$ of the mesh.

The value of the variable can also be determined in a different way than by means of the control deviation 17. For example, the output signal 19 also supplies a measurement for the variable which could be inputted to the variable observer 8.

When gain is low during the transfer of control deviation 17 to the sample and hold circuits 10 and/or when the integration constants of the integrators 11 are small, the effect of stochastic deviations of the torque can be kept low. This corresponds to a small I-share of a PI controller. Accordingly, the correction signal 18 adapts, of course, only relatively slowly to a change in torque from cycle to cycle.

Instead of integrators 11, n storages 11' can also be installed in which the content of the circuits 10 is added to the storage content, the transfer being controlled by pulses of the synchronizing circuit 13, after a new value has been read into the corresponding sample and hold circuit 10.

The process described is generally applicable to processes having variable loads which change cyclically and whose cycle time and phase can be determined independently of the value of the variable if the variations in the value of the variable within a cycle are larger than the differences observed between successive cycles. These prerequisites are fulfilled in many mechanical processing processes, however, also in chemical processes, optimization processes etc. This process is especially expedient for high frequency cyclical processes that generally cannot be controlled with a PI controller for reasons of stability.

While the invention has been particularly shown and described with reference to preferred embodiments thereof it will be understood by those in the art that the foregoing and other changes in form and details may be made therein without departing from the spirit and scope of the invention.

What is claimed is:

1. An apparatus for controlling the rate of rotation of a spindle of a gear generating machine comprising a first spindle having a first angle of rotation transmitter connected thereto and a second spindle having a second angle of rotation transmitter connected thereto, controller means providing an output signal controlling a drive of the first spindle and storage circuit means including means for generating and storing a variable signal in discrete time intervals within a cycle (T) and adding circuit means for adding the storage content to the output signal of said controller means synchronously with an independent signal, wherein said storage circuit means comprises several storages and a multiplexer circuit which is controlled by said independent signal and is connected in series to said storages.

2. An apparatus as claimed in claim 1 wherein each storage is followed by one integrator respectively and the integrators are connected to the adding circuit means by means of a demultiplexer circuit which is controlled by said independent signal.

3. An apparatus as claimed in claim 1 wherein each storage is followed by one second storage respectively and the second storages are connected to the adding circuit means by means of a demultiplexer circuit which is controlled by said independent signal.

4. A process for controlling the rate of rotation of a spindle of a gear generating machine operating in a continuous gear generating process, in which a first spindle has a drive controlled by a control output of an electronic controller, in which said controller insures synchronization with a second spindle, the process comprising the steps of:
measuring the angle of rotation of both spindles;
comparing the measured angle of rotation of the two spindles and forming a control deviation;
feeding the control deviation as an input to the controller;
forming a synchronizing signal synchronous with the rotation of one of the spindles;
reading the control deviation sequentially into each one of several storages in synchronism with the synchronizing signal;
integrating the content of each storage in a separate respective integrator;
forming a correction signal by sequentially reading the content of the integrators in synchronism with the synchronizing signal; and
adding the correction signal to the control output.

5. A process as claimed in claim 4, wherein the synchronizing signal is formed by an index signal occurring once per revolution of the second spindle.

6. A process as claimed in claim 4, wherein the synchronizing signal is derived from an output signal of an angle transmitter of the first spindle.

7. A process for controlling the rate of rotation of a spindle of a gear generating machine operating in a continuous gear generating process, in which a first spindle has a drive controlled by a control output of an electronic controller, in which said controller insures synchronization with a second spindle, the process comprising the steps of:

measuring the angle of rotation of both spindles;

comparing the measured angle of rotation of the two spindles and forming a control deviation;

feeding the control deviation as an input to the controller;

forming a synchronizing signal synchronous with the rotation of one of the spindles;

reading the control deviation sequentially into each one of several storages in synchronism with the synchronizing signal;

adding the content of each storage to the content of a separate respective second storage each synchronously with the synchronizing signal;

forming a correction signal by sequentially reading the content of the second storages in synchronism with the synchronizing signal; and adding the correction signal to the control output.

8. A process as claimed in claim 7 wherein the synchronizing signal is formed by an index signal occuring once per revolution of the second spindle.

9. A process as claimed in claim 7 wherein the synchronizing signal is derived from an angle transmitter of the first spindle.

* * * * *